United States Patent
Woolsey (12)

(10) Patent No.: US 6,315,327 B1
(45) Date of Patent: Nov. 13, 2001

(54) PROTECTIVE COVER FOR VEHICLE SURFACE

(76) Inventor: Clay F. Woolsey, 628 15th St., Huntington Beach, CA (US) 92648

(*) Notice: Subject to any disclaimer, the term of this patent is extended or adjusted under 35 U.S.C. 154(b) by 0 days.

(21) Appl. No.: 09/258,615

(22) Filed: Feb. 26, 1999

(51) Int. Cl.[7] ................................................ B62D 25/00
(52) U.S. Cl. ........................................................ 280/770
(58) Field of Search ........................... 280/770; 293/128, 293/126, 41, 102; 296/136, 98, 40

(56) References Cited

U.S. PATENT DOCUMENTS

| | | | |
|---|---|---|---|
| 3,665,355 | 5/1972 | Sasaki et al. | 335/306 |
| 4,219,218 | 8/1980 | Waldon | 280/770 |
| 4,294,478 | 10/1981 | Marquette | 293/128 |
| 4,531,560 | 7/1985 | Balanky | 150/52 K |
| 4,652,037 | 3/1987 | Thau et al. | 296/78 R |
| 4,896,911 | 1/1990 | Duke | 293/128 |
| 4,940,009 | 7/1990 | Keithley, Jr. | 114/343 |
| 5,050,925 | 9/1991 | Brown | 296/136 |
| 5,267,763 | 12/1993 | Klein | 293/128 |
| 5,312,145 | 5/1994 | McNeil | 293/128 |
| 5,529,371 | 6/1996 | Egigian | 296/164 |
| 5,664,825 | 9/1997 | Henke et al. | 296/136 |
| 5,799,992 * | 9/1998 | Kojima | 280/770 |
| 5,931,522 * | 8/1999 | Roskey | 280/770 |
| 5,984,401 * | 11/1999 | Hannah | 280/770 |

FOREIGN PATENT DOCUMENTS

2231602 * 2/1974 (DE) ..................................... 280/770

* cited by examiner

Primary Examiner—Richard M. Camby
(74) Attorney, Agent, or Firm—Stetina Brunda Garred & Brucker

(57) ABSTRACT

A resilient protective cover for placement on a vehicle surface area such that the cover is disposed between the surface area and an item subsequently placed against that surface area. The cover includes a flexible resilient layer capable of absorbing weight pressure of the item subsequently placed there against, and a flexible magnetized layer releasably magnetically securable to the vehicle surface area and to which the resilient layer is adhered. The resilient layer preferably has a generally non-slip surface whose surface tension value inhibits slippage of the item placed against it. A score line can be provided at an anticipated bend site, and a cut-out portion likewise can be situated to accommodate vehicle equipment such as a brake light, for example, at an anticipated equipment site. The cover can be sized to extend externally from a roof site over an intersection site to a rear wall site of a cab portion of a pickup truck, with an edge of the resilient layer placeable on the roof site and meant to be oriented in a forward direction being beveled to counteract the tendency of head-on airflow caused by vehicle movement to lift the cover from the roof site. In this manner, a generally stationary protective cover for a vehicle surface is provided against which a cargo item can be positioned without damaging the underlying surface of the vehicle during transport.

22 Claims, 1 Drawing Sheet

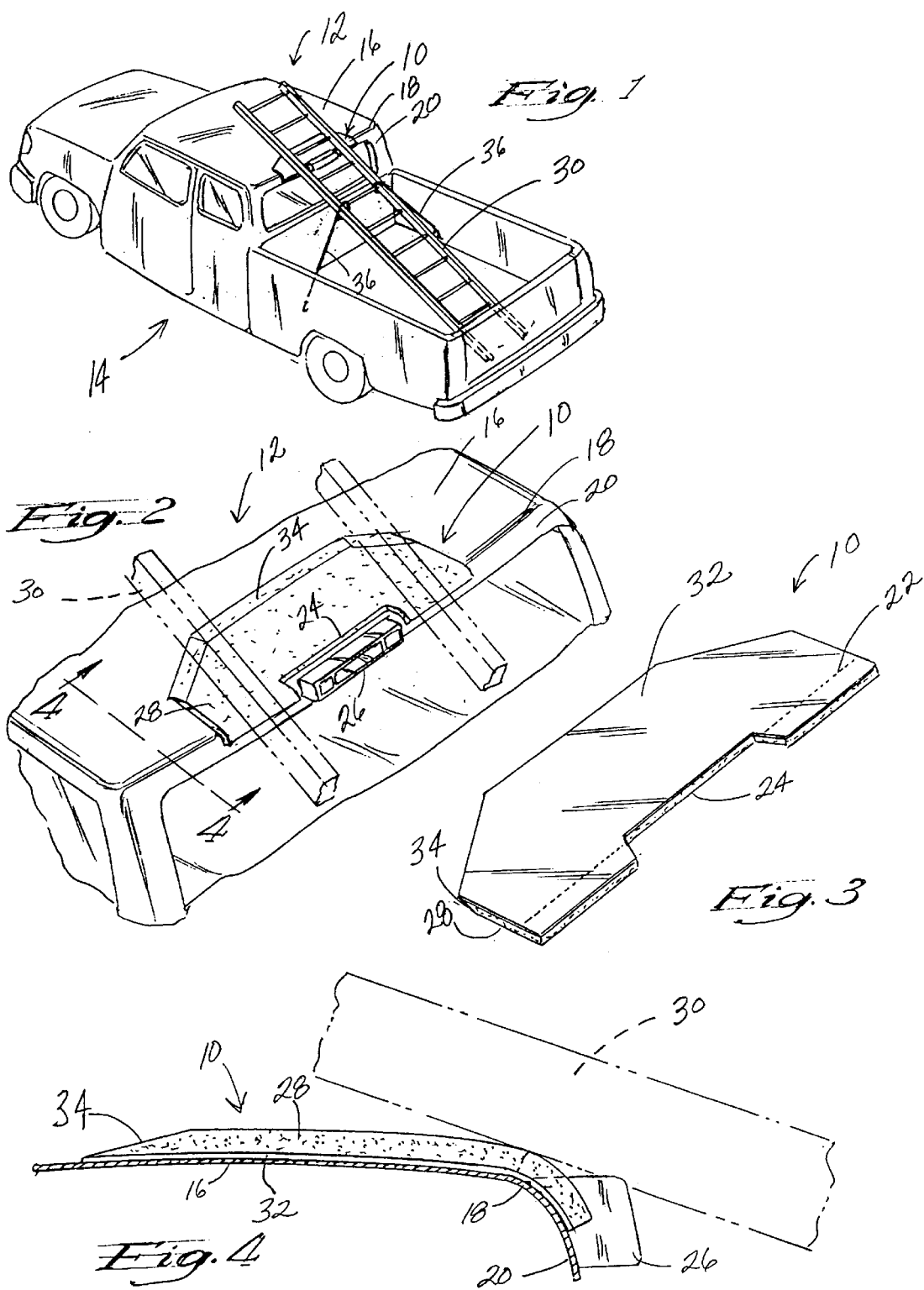

PROTECTIVE COVER FOR VEHICLE SURFACE

FIELD OF THE INVENTION

This invention relates in general to protective covers, and in particular to a flexible, magnetized, resilient protective cover for generally-conforming placement on a vehicle surface such that items to be hauled can be lodged against the surface so covered without causing damage during transport.

BACKGROUND OF THE INVENTION

The importance and desirability of maintaining vehicle finishes in good condition are recognized by both automobile and truck owners and operators. Such maintenance not only enhances the general appearance of a vehicle, but also contributes to preservation of vehicle integrity by reducing paint abrasions and subsequent rust formation and body degradation. Present protective product availability includes full vehicle covers, front-end covers, and side guards. Such full cover products are exemplified by Sasaki et al. (U.S. Pat. No. 3,665,355), Balanky (U.S. Pat. No. 4,531,560), and Henke et al. (U.S. Pat. No. 5,664,825), while a front end protector is taught by Waldon (U.S. Pat. No. 4,219,218). Side guard products are defined by Marquette (U.S. Pat. No. 4,294,478), Duke (U.S. Pat. No. 4,896,911), Brown (U.S. Pat. No. 5,050,925), Klein (U.S. Pat. No. 5,267,763), and McNeil (U.S. Pat. No. 5,312,145). Many of these products can be retained in place magnetically as they generally passively protect a vehicle finish primarily from weather conditions, road hazards, or minor impacts from doors of adjacently parked vehicles.

While the above devices deal with common damage that occurs during the course of driving and/or parking, none addresses protection of vehicle surfaces that can be damaged during use of the vehicle for hauling bulky items that may be in touch with such surfaces. Thus, for instance, a pickup truck may be employed to carry a ladder that is longer than the bed of the truck. A common solution for accommodating such cargo is to stand it angularly upward against the rear of the cab portion of the truck such that the cargo leans against the surface location primarily at the rear junction of the roof and the rear wall and is secured with rope or the like. When this approach is employed, the cargo (e.g. ladder) easily rubs against the surface and scratches the paint, leading to degradation of the vehicle.

In view of the above-discussed problem that occurs during transport of out-size items, it is apparent that a need is present for protection of relevant vehicle surfaces. Accordingly, a primary object of the present invention is to provide a generally stationary protective cover for a vehicle surface against which a cargo item can be positioned without damaging the underlying vehicle surface.

Another object of the present invention is to provide such a protective cover having resiliency to thereby absorb weight pressure of the cargo item without transferring damaging pressure to the underlying vehicle surface.

Yet another object of the present invention is to provide such a protective cover that conforms to vehicle profile and accommodates the presence of vehicle equipment whose operation must not be impeded.

These and other objects of the present invention will become apparent throughout the description thereof which now follows.

SUMMARY OF THE INVENTION

The present invention is a resilient protective cover for placement on a vehicle surface area such that the cover is disposed between the surface area and an item subsequently placed against that surface area. The cover comprises a flexible resilient layer capable of absorbing weight pressure of the item subsequently placed there against, and a flexible magnetized layer releasably magnetically securable to the vehicle surface area and to which the resilient layer is adhered. The resilient layer preferably has a generally non-slip surface whose surface tension value inhibits slippage of the item placed against it. A score line can be provided at an anticipated bend site, and a cut-out portion likewise can be situated to accommodate vehicle equipment such as a brake light, for example, at an anticipated equipment site. A cover can be sized to extend externally from a roof site over an intersection site to a rear wall site of a cab portion of a pickup truck, with an edge of the resilient layer placeable on the roof site and meant to be oriented in a forward direction being beveled to counteract the tendency of head-on airflow caused by vehicle movement to lift the cover from the roof site. In this manner, a generally stationary protective cover for a vehicle surface is provided. A cargo item can be positioned against the cover without damaging the underlying surface of the vehicle during transport. As necessary, of course, one or more tie-down ropes or cords can be connected between the cargo item and the vehicle to thereby assure safe transit.

BRIEF DESCRIPTION OF THE DRAWINGS

An illustrative and presently preferred embodiment of the invention is shown in the accompanying drawings in which:

FIG. 1 is a perspective view of a pickup truck with a resilient protective cover thereon against which a ladder is positioned;

FIG. 2 is an enlarged view of the resilient protective cover on the truck;

FIG. 3 is a perspective view of the resilient protective cover alone and upside down; and FIG. 4 is a side elevation view of the protective cover along line 4—4 of FIG. 2.

DETAILED DESCRIPTION OF THE PREFERRED EMBODIMENTS

Referring to FIGS. 1, 2, and 4, a resilient protective cover 10 is shown in place on a cab portion 12 of a pickup truck 14. The cover 10 extends from a roof 16 of the cab portion 12 across an intersection site 18 to a rear wall 20 thereof. A score line 22 as shown clearly in FIG. 3 generally conforming in location to the intersection site 18 of the roof 16 and rear wall 18 is provided to thereby facilitate bending over the intersection site 18. A cut-out 24 is provided to the cover 10 to accommodate a high-mounted brake light 26.

The protective cover 10 is constructed of a flexible resilient layer 28 capable of absorbing weight pressure of an item subsequently placed there against such as a ladder 30 illustrated in full in FIG. 1. The resilient layer 28 can be of any open cell or closed cell foam as would be recognized in the art to accomplish the purpose here described, and preferably has a generally non-slip surface whose surface tension value inhibits slippage of an item placed there against. A flexible magnetized layer 32 is adhered to the resilient layer 28 to thereby permit releasable magnetic securement of the cover 10 to a vehicle surface area such as that here exemplified by the roof 16 and rear wall 20. The magnetized layer 32 can be constructed as known in the art, including a rubberized matrix having magnetic particles generally uniformly distributed throughout. The exposed opposing surface of the resilient layer 28 optionally can have applied thereon a conventional non-magnetized flexible rubber coating. As shown in FIGS. 2, 3 and 4, a beveled edge 34 can be provided to the resilient layer 28 such that the beveled edge 34 is placeable on the roof 12 to be directed forward to thereby reduce wind resistance as transport travel occurs.

Operation of the protective cover 10 is best exemplified in FIG. 1. Specifically, the cover 10 is secured by magnetic attraction to the cab portion 12 of the truck 14 such that the cover 10 extends from the roof 16 of the cab portion 12 across the corner intersection site 18 to the rear wall 20 thereof. Placement of the cover 10 is such that the score line 22 (FIG. 3) generally conforms in location to the intersection site 18 for bending over the intersection site 18. The cover 10 is adjusted so that the cut-out 24 accommodates a high-mounted brake light 26 if present and the beveled edge 34 faces forward. After such placement of the cover 10, the item (e.g. a ladder 30) to be placed against the cover 10 is introduced into the truck 14 and against the cover 10 such that weight of the item is absorbed by the resilient layer 28 of the cover 10. Once that item is generally situated for transport, it can be secured by conventional cords 36 or the like to body portions of the truck 14. Because the resilient layer 28 or optional rubber coating has a generally non-slip surface, lateral movement of the transported item is inhibited.

In this manner, the surface of a vehicle can be protected while simultaneously functioning as a support for a transported item. While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A resilient protective cover for placement on a vehicle surface area such that said cover is disposed between the surface area and an item subsequently placed against said surface area, the cover comprising:
   a) a flexible resilient layer capable of absorbing weight pressure of the item subsequently placed there against; and
   b) a flexible magnetized layer releasably magnetically securable to the vehicle surface area and to which the resilient layer is adhered, said magnetized layer being substantially co-extensive with said resilient layer, with said cover having a cut-out portion situated to accommodate a vehicle equipment at an anticipated equipment site on the vehicle surface area.

2. A resilient protective cover as claimed in claim 1 wherein the resilient layer has a generally non-slip surface whose surface tension value inhibits slippage of the item placed there against.

3. A resilient protective cover as claimed in claim 1 having in addition a score line disposed at an anticipated bend site.

4. A resilient protective cover as claimed in claim 1 wherein the vehicle equipment is a light at a light site.

5. A resilient protective cover as claimed in claim 1 wherein at least one edge of the resilient layer is beveled.

6. A resilient protective cover as claimed in claim 1 sized to extend externally from a roof site over an intersection site to a rear wall site of a cab portion of a pickup truck.

7. A resilient protective cover as claimed in claim 6 wherein said cover has a score line generally conforming in location to the intersection site.

8. A resilient protective cover for placement on a vehicle surface area such that said cover is disposed between the surface area and an item subsequently placed against said surface area, the cover comprising:
   a) a flexible resilient layer capable of absorbing weight pressure of the item subsequently placed there against, said resilient layer having a generally non-slip surface whose surface tension value inhibits slippage of the item placed there against;
   b) a flexible magnetized layer releasably magnetically securable to the vehicle surface area and to which the resilient layer is adhered;
   c) a score line disposed at an anticipated bend site; and
   d) a cut-out portion situated to accommodate vehicle equipment at an anticipated equipment site.

9. A resilient protective cover as claimed in claim 8 wherein said cover is sized to extend externally from a roof site over an intersection site to a rear wall site of a cab portion of a pickup truck, and wherein the score line generally conforms in location to the intersection site.

10. A resilient protective cover as claimed in claim 9 wherein an edge of the resilient layer placeable on the roof site and directable forwardly is beveled.

11. A resilient protective cover as claimed in claim 10 wherein the cut-out portion is situated to accommodate a stop light disposed on the rear wall site.

12. A resilient protective cover for placement on a vehicle surface area such that said cover is disposed between the surface area and an item subsequently placed against said surface area, the cover comprising:
   a) a flexible resilient layer capable of absorbing weight pressure of the item subsequently placed there against; and
   b) a flexible magnetized layer releasably magnetically securable to the vehicle surface area and to which the resilient layer is adhered, whereby said cover is sized to extend externally from a roof site over an intersection site to a rear wall site of the vehicle surface area, with said cover having a cut-out portion situated to accommodate a vehicle equipment at an anticipated equipment site on the vehicle surface area.

13. A resilient protective cover as claimed in claim 12 wherein the resilient layer has a generally non-slip surface whose surface tension value inhibits slippage of the item placed there against.

14. A resilient protective cover as claimed in claim 12 having in addition a score line disposed at an anticipated bend site.

15. A resilient protective cover as claimed in claim 12 wherein the vehicle equipment is a light at a light site.

16. A resilient protective cover as claimed in claim 12 wherein at least one edge of the resilient layer is beveled.

17. A resilient protective cover as claimed in claim 12 wherein said cover has a score line generally conforming in location to the intersection site.

18. A resilient protective cover for placement on a vehicle surface area such that said cover is disposed between the surface area and an item subsequently placed against said surface area, the cover comprising:
   a) a flexible resilient layer capable of absorbing weight pressure of the item subsequently placed there against; and
   b) a flexible magnetized layer releasably magnetically securable to the vehicle surface area and to which the resilient layer is adhered, said magnetized layer being substantially co-extensive with said resilient layer, wherein said cover is sized to extend externally from a roof site over an intersection site to a rear wall site of the vehicle surface area.

19. A resilient protective cover as claimed in claim 18 wherein said cover has a score line generally conforming in location to the intersection site.

20. A resilient protective cover as claimed in claim 18 having in addition a score line disposed at an anticipated bend site.

21. A resilient protective cover as claimed in claim 18 wherein at least one edge of the resilient layer is beveled.

22. A resilient protective cover as claimed in claim 18 wherein the resilient layer has a generally non-slip surface whose surface tension value inhibits slippage of the item placed there against.

* * * * *